US007149618B2

(12) United States Patent
Heap et al.

(10) Patent No.: US 7,149,618 B2
(45) Date of Patent: Dec. 12, 2006

(54) COST STRUCTURE METHOD INCLUDING FUEL ECONOMY AND ENGINE EMISSION CONSIDERATIONS

(75) Inventors: Anthony H. Heap, Ann Arbor, MI (US); William R. Cawthorne, Milford, MI (US); Gregory A. Hubbard, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 32 days.

(21) Appl. No.: 11/112,151

(22) Filed: Apr. 22, 2005

(65) Prior Publication Data

US 2005/0256633 A1 Nov. 17, 2005

Related U.S. Application Data

(60) Provisional application No. 60/571,664, filed on May 15, 2004.

(51) Int. Cl.
*F02D 43/04* (2006.01)
*G06F 19/00* (2006.01)

(52) U.S. Cl. ....................... 701/102; 123/350; 701/110

(58) Field of Classification Search ................ 123/350, 123/352; 701/101–104, 11
See application file for complete search history.

(56) References Cited

U.S. PATENT DOCUMENTS

| | | | | |
|---|---|---|---|---|
| 6,718,251 | B1 * | 4/2004 | Brackney et al. | 701/103 |
| 6,957,137 | B1 * | 10/2005 | Hubbard et al. | 701/54 |
| 7,076,356 | B1 * | 7/2006 | Hubbard et al. | 701/55 |
| 2005/0080537 | A1 * | 4/2005 | Cawthorne et al. | 701/51 |
| 2005/0080539 | A1 * | 4/2005 | Hubbard et al. | 701/54 |

* cited by examiner

*Primary Examiner*—T. M. Argenbright
(74) *Attorney, Agent, or Firm*—Christopher DeVries

(57) ABSTRACT

A powertrain control selects engine operating points in accordance with power loss minimization controls. Power loss contributions come from a variety of sources including engine power losses. Engine power losses are determined in accordance with engine operating metrics such as power production per unit fuel consumption and power production per unit emission production. Engine power losses are combined in accordance with assigned weighting into a single engine power loss term for use in the power loss minimization control and operating point selection.

20 Claims, 4 Drawing Sheets

COST STRUCTURE METHOD INCLUDING FUEL ECONOMY AND ENGINE EMISSION CONSIDERATIONS

CROSS REFERENCE TO RELATED APPLICATIONS

This application claims priority to U.S. Provisional Ser. No. 60/571,664 filed on May 15, 2004, which is hereby incorporated herein by reference in its entirety.

TECHNICAL FIELD

The present invention is related to control of a vehicular powertrain. More particularly, the invention is concerned with balancing fuel efficiency and emissions in an internal combustion engine.

BACKGROUND OF THE INVENTION

An internal combustion engine can be operated at certain torque and speed combinations to achieve peak fuel efficiency. This knowledge is particularly useful in hybrid vehicle applications architected to allow for selection and control of the engine speed and torque combination as an operating point. An internal combustion engine also produces certain by-products (emissions) as a result of its operation. Depending upon the type of engine, included in these emissions are such things as oxides of nitrogen (NOx), carbon monoxide (CO), unburned hydrocarbons (HC), particulate matter (PM) (i.e., soot), sulfur dioxide (SO2) and noise, for example. It is known that operating an internal combustion engine at peak fuel efficient torque and speed combinations may not result in minimal emission generation. In fact, certain emissions may increase disproportionately to the fuel efficiency gains as the torque and speed conditions converge toward combinations associated with optimal fuel efficiency.

An electrically variable transmission (EVT) can be advantageously used in conjunction with an internal combustion engine to provide an efficient parallel hybrid drive arrangement. Various mechanical/electrical split contributions can be effected to enable high-torque, continuously variable speed ratios, electrically dominated launches, regenerative braking, engine off idling, and multi-mode operation. See, for example, the two-mode, compound split, electromechanical transmission shown and described in the U.S. Pat. No. 5,931,757 to Schmidt, where an internal combustion engine and two electric machines (motors/generators) are variously coupled to three interconnected planetary gearsets. Such parallel EVTs enjoy many advantages, such as enabling the engine to run at high efficiency operating conditions. However, as noted above, such high efficiency operating conditions for the engine may in fact be associated with undesirably high engine emissions.

An EVT control establishes a preferred operating point for a preselected powertrain operating parameter in a powertrain system corresponding to a minimum system power loss. System power loss may include other factors not related to actual power loss but effective to bias the minimum power loss away from operating points that are less desirable because of other considerations such as battery use in a hybrid powertrain.

SUMMARY OF THE INVENTION

An engine power loss term for use in a powertrain power loss minimization control is calculated by providing first and second power loss terms corresponding to engine operating points that attribute power losses to engine operation at the engine operating points relative to an engine operating point that is maximally efficient with respect to first and second engine operating metrics, respectively. The first and second power loss terms are combined at respective engine operating points into an engine power loss term. Exemplary engine operating metrics include engine power per unit fuel consumption and engine power per unit emission production and preferred engine operating points are with respect to engine torque and engine speed. Emissions, for example, may be with respect to oxides of nitrogen, carbon monoxide, unburned hydrocarbons, particulate matter, sulfur dioxide, noise or combinations thereof.

A desirable engine operating point for an internal combustion engine is determined by providing first and second power loss terms corresponding to engine operating points that attribute power losses to engine operation at the engine operating points relative to engine operating points that are maximally efficient with respect to engine power per unit fuel consumption and maximally efficient with respect to engine power per unit emission production, respectively. The first and second power loss terms at equivalent engine operating points are combined into a total power loss term. The desirable engine operating point is selected as the operating point corresponding to the minimum total power loss term. Preferred engine operating points are with respect to engine torque and engine speed. Emissions, for example, may be with respect to oxides of nitrogen, carbon monoxide, unburned hydrocarbons, particulate matter, sulfur dioxide, noise or combinations thereof. First power loss terms may be provided by mapping engine operating points to power losses corresponding to the difference between (a) engine power attainable at a maximally fuel efficient engine operating point with engine fueling corresponding to the mapped engine operating point and (b) engine power corresponding to the mapped engine operating point. Second power loss terms may be provided by mapping engine operating points to power losses corresponding to the difference between (a) engine power attainable at a maximally emission efficient engine operating point with engine emissions corresponding to the mapped engine operating point and (b) engine power corresponding to the mapped engine operating point.

A desirable engine operating point for an internal combustion engine is determined by mapping engine operating points to fuel power losses and emission power losses. The fuel power losses correspond to the difference between (a) engine power attainable at a maximally fuel efficient engine operating point with engine fueling corresponding to the mapped engine operating point and (b) engine power corresponding to the mapped engine operating point. The emission power losses correspond to the difference between (a) engine power attainable at a maximally emission efficient engine operating point with engine emissions corresponding to the mapped engine operating point and (b) engine power corresponding to the mapped engine operating point. Fuel power losses and emission power losses at the mapped engine operating points are weighted and aggregated into total power loss terms at the mapped engine operating points. The desirable engine operating point is selected as the mapped engine operating point corresponding to a minimum total power loss term. Preferred engine operating points are with respect to engine torque and engine speed.

Emissions, for example, may be with respect to oxides of nitrogen, carbon monoxide, unburned hydrocarbons, particulate matter, sulfur dioxide, noise or combinations thereof.

DESCRIPTION OF THE PREFERRED EMBODIMENT

Figure 1:
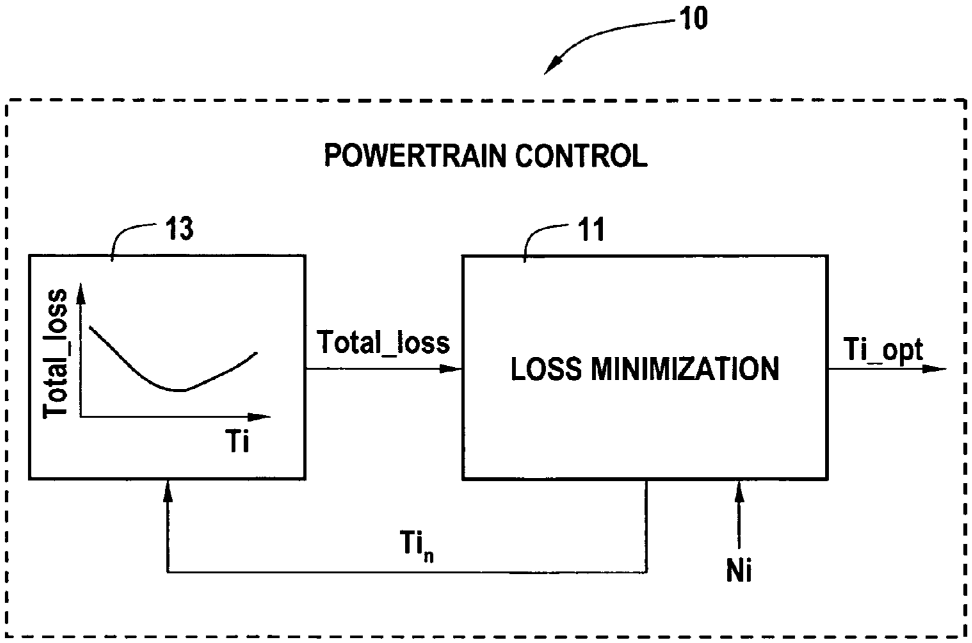
FIG. 1 is a schematic diagram of an exemplary control structure for establishing an engine operating point in accordance with aggregate system power loss data derived in accordance with the present invention.

In an exemplary use or implementation of the present invention, a powertrain control for a hybrid electric vehicle establishes a preferred operating point for an internal combustion engine. For example, in FIG. 1, powertrain control 10 operating in microprocessor based control hardware (not separately shown) establishes a preferred engine torque operating point (Ti_opt) through a loss minimization routine 11. Loss minimization routine evaluates a plurality of available torque operating points ($Ti_n$) and associated aggregate powertrain system loss data (Total_loss) to establish a preferred engine torque operating point (Ti_opt). Aggregate powertrain system power loss data is referenced from predetermined data structures comprising system characterized loss data including certain objectively quantifiable power losses. Additional detail regarding such powertrain control is disclosed in detail in co-pending and commonly assigned U.S. patent application Ser. No. 10/799,531 now U.S. Pat. No. 7,076,356, the contents of which are incorporated herein by reference.

Additionally, the aggregate system power loss data may be referenced in determination of preferred engine speed operating points as described, for example, in commonly assigned U.S. patent application Ser. No. 10/686,508 now U.S. Pat. No. 7,110,871 and commonly assigned U.S. patent application Ser. No. 10/686,034 now U.S. Pat. No. 6,957,137, the contents of both being incorporated herein by reference.

Aggregate powertrain system loss (Total_loss) may be represented in the following relationship:

$$\mathit{Total}\_\text{loss}=\text{Ploss\_total}+\text{Pcost}\_\mathit{sub} \quad (1)$$

where Ploss_total is overall system power loss; and

Pcost_sub is a scaled subjective cost penalty.

Overall system power loss, Ploss_total, is a summation of individual subsystem power losses as follows:

$$\text{Ploss\_total}=\text{Ploss\_mech}+\text{Ploss\_eng}+\text{Ploss}\_\mathit{other} \quad (2)$$

where Ploss_mech represents transmission losses such as hydraulic pumping loss, spin loss, clutch drag, etc.;

Ploss_eng is a composite engine power loss term including fuel economy and emission economy considerations as set forth in further detail herein below; and Ploss_other represents the summation of any other sources of power loss within the system, including mechanical, electrical and heat losses.

The mechanical losses (Ploss_mech) are provided for reference in pre-stored table format indexed by transmission input and output speeds, having been empirically derived from conventional dynamometer testing of the transmission unit throughout its various modes or gear ratio ranges of operation as the case may be.

Figure 3:
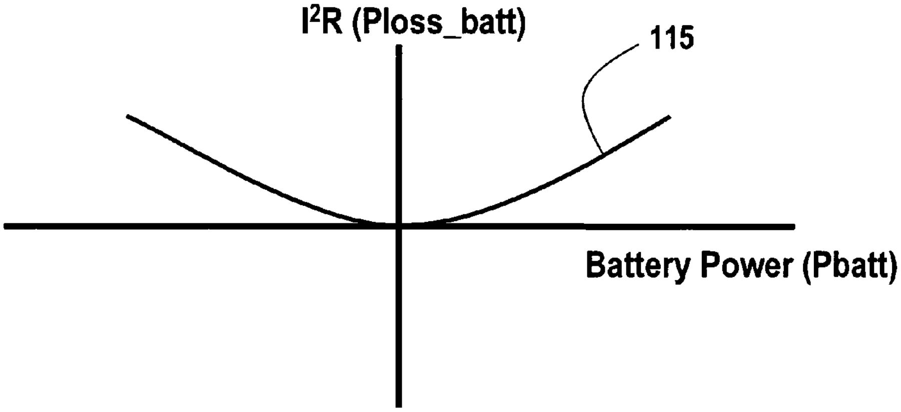
FIG. 3 is a graphical representation of battery power losses vs. battery power characteristic data utilized in the determination of battery power losses in accordance with the present invention.
Figure 2A:
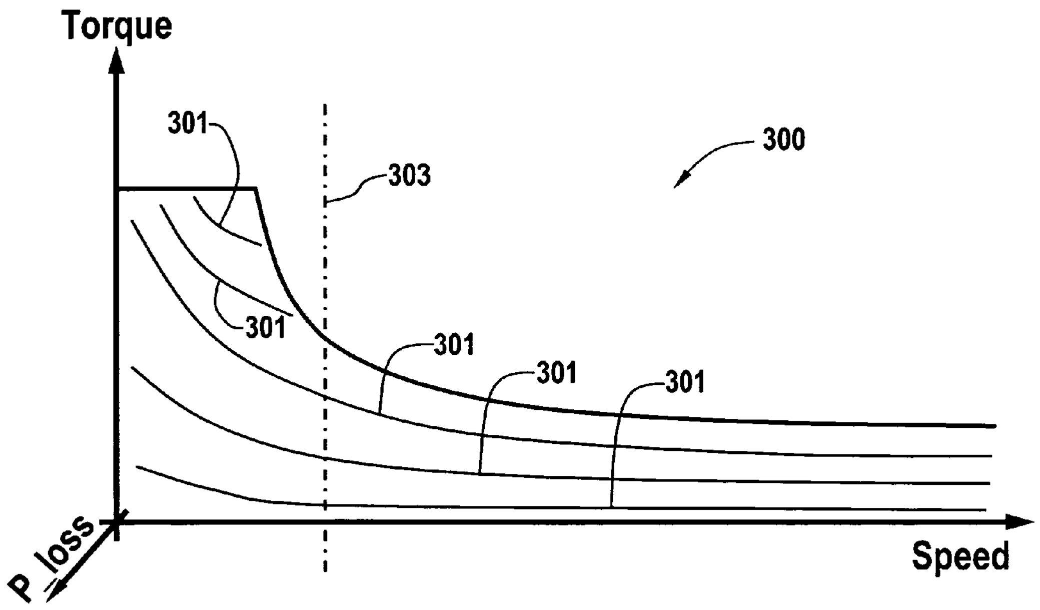
FIGS. 2A and 2B illustrate characteristic machine torque, speed and power loss relationships.
Figure 2B:
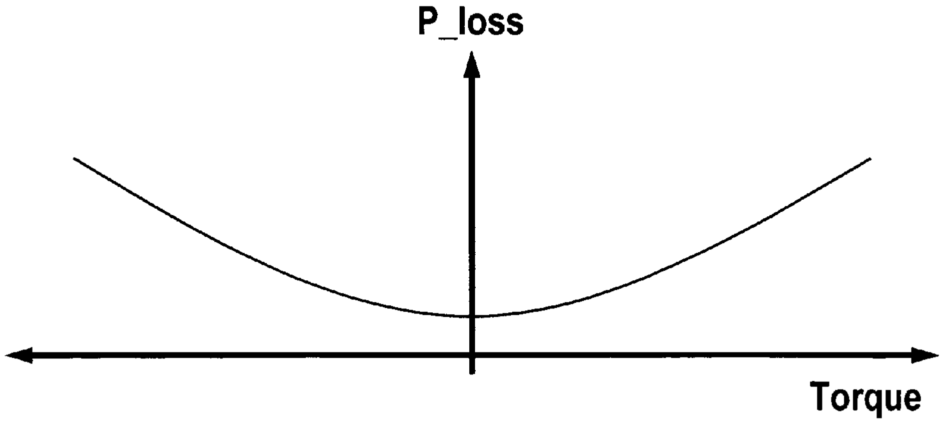

Examples of such other power losses, Ploss_other, in a hybrid powertrain would include electric machine losses, Ploss_machine (representing aggregate motor and power electronics losses), and internal battery power losses, Ploss_batt (representing commonly referred to $I^2R$ losses). Electric machine losses, Ploss_machine, may be provided in pre-stored data sets indexed by the machine torque and machine speed data, the data sets having been empirically derived from conventional dynamometer testing of the combined machine and power electronics (e.g. power inverter). With reference to FIGS. 2A and 2B, torque-speed-power loss characteristics for typical rotating electric machines are shown. In FIG. 2A, lines of constant power loss 301 are shown plotted on the torque-speed plane for the motor. Broken line labeled 303 corresponds to a plane of constant motor speed and, as viewed in relation to FIG. 2B, illustrates the generally parabolic characteristics of power loss versus motor torque. Internal battery power losses, Ploss_batt, may be provided in pre-stored data sets indexed by battery power, the data sets having been generated from battery equivalence models and battery power. An exemplary representation of such characteristic battery power vs. loss data 115 is illustrated herein in FIG. 3.

Figure 4:
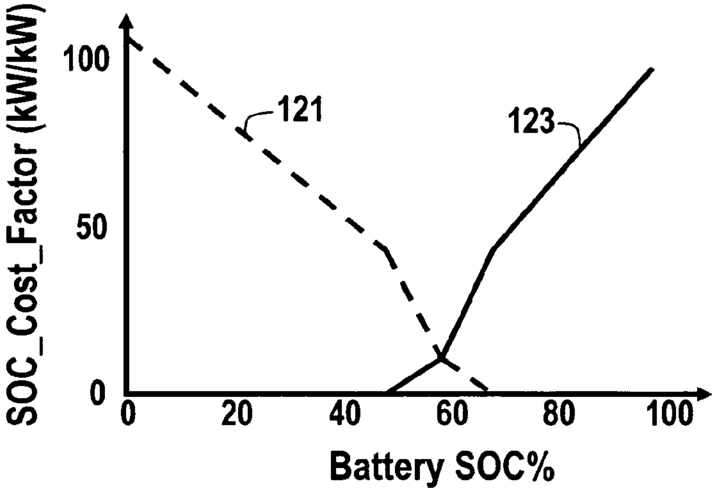
FIG. 4 is a graphical representation of state of charge cost factors across the range of battery states of charge attributed to battery power flows and as utilized in the determination of battery utilization cost considered in the optimum input torque determination of the present invention.
Figure 5:
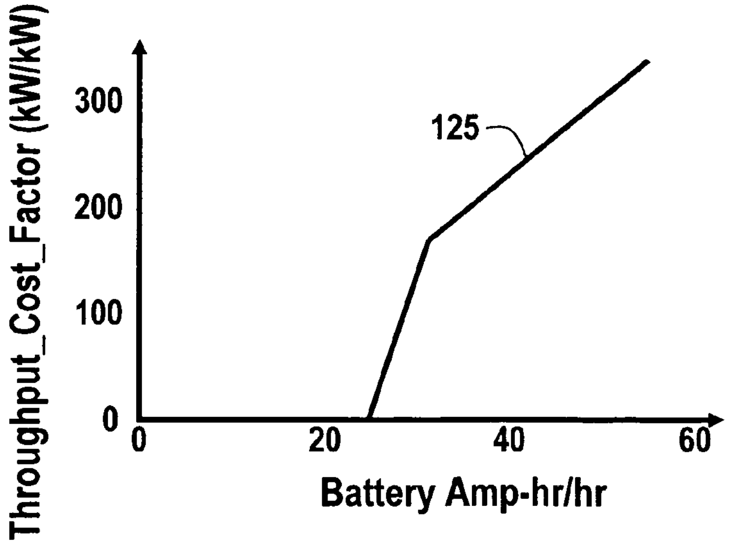
FIG. 5 is a graphical representation of battery throughput cost factors across the range of battery throughput as utilized in the determination of battery utilization cost considered in the optimum input torque determination of the present invention.

Scaled subjective cost penalty, Pcost_sub, represents aggregated penalties which, unlike the subsystem power losses making up Plos_total described up to this point, cannot be derived from physical loss models, but rather represent another form of penalty against operating the system at particular points. But these penalties are subjectively scaled with units of power loss so they can be factored with the subsystem losses described above. Examples of such scaled subjective cost penalties in a hybrid powertrain may include a first battery cost factor term, SOC_cost_Factor, to penalize charging at high states of charge (solid line 123 in FIG. 4) and penalize discharging at low states of charge (broken line 121 in FIG. 4). Scaled subjective cost penalties in a hybrid powertrain may further include a second battery cost factor term, Throughput_Cost_Factor, to capture the effect of battery age by assigning appropriate penalties thereto (line 125 in FIG. 5). Battery age is preferably measured in terms of average battery current (Amp-hr/hr), and a penalty placed on average battery current operating points that increases with higher battery current. Such cost factors are preferably obtained from pre-stored data sets indexed by battery state-of-charge (SOC %) and battery age (Amp-hr/hr), respectively. The product of the respective cost factors and battery power (Pbatt) yields the cost function terms, Pcost_SOC and Pcost_throughput. Additional details surrounding subjective cost factors are disclosed in commonly assigned and co-pending U.S. provisional patent application Ser. No. 60/511,456, now U.S. Ser. No. 10/965,671, which is incorporated herein by reference.

The total subjective cost is determined in accordance with the summation of the individual subjective costs in the following example of SOC and throughput penalties:

$$Pcost\_sub=Pcost\_SOC+Pcost\_throughput \quad (3)$$

where Pcost_SOC=Pbatt*SOC_Cost_Factor; and

Pcost_throughput=Pbatt*Throughput_Cost_Factor

Of course, Pcost_sub is scaled into the same units as the subsystem power losses described above.

This invention allows for reasonable trade-offs to be made between optimizing the system to maximize fuel economy and minimizing engine emissions. The result is a system operation that yields both close to maximum fuel economy and low emissions.

A cost structure is developed based on engine operation (both fuel consumption and engine emissions) in terms of a system power loss. The cost structure biases engine operating points in a fashion that makes the desired trade off between fuel economy and emissions. By formulating a composite engine power loss term, it enables an optimization to be performed at the system level with other system losses described.

Figure 6:
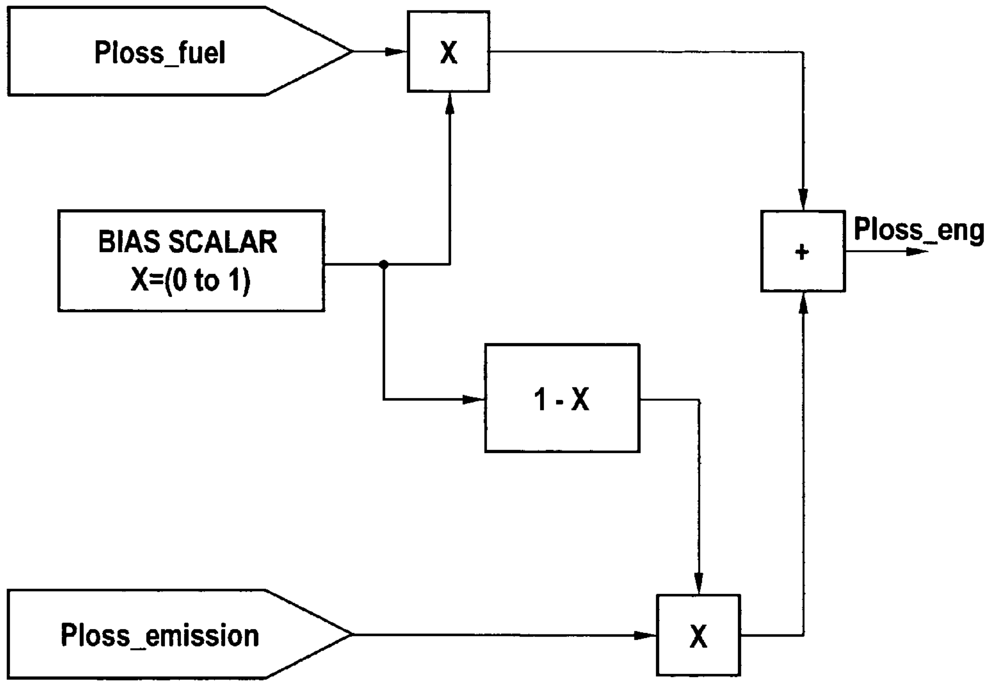
FIG. 6 is a schematic diagram of a preferred control for establishing a composite engine power loss term in accordance with the present invention.

A schematic diagram of a preferred control for establishing a composite engine power loss term, Ploss_eng, in accordance with the present invention is shown in FIG. 6. The inputs are a fuel economy engine power loss term (Ploss_fuel) and an emission economy engine power loss term (Ploss_emission), both preferably established as functions of engine speed and engine torque.

The fuel economy engine power loss term (Ploss_fuel) is determined in accordance with pre-stored tabulated data. The fuel economy engine power losses are provided for reference in pre-stored table format indexed by engine torque and speed. The preferred manner of generating such tables is through application of a loss equation as follows for calculation of fuel economy engine power loss:

$$\text{Ploss\_}fuel=\eta_{MAX\_fuel}*LHV\ (\text{kj/g})*Q_{FUEL}\ (\text{g/s})-P_{OUT} \quad (4)$$

where $\eta_{MAX\_fuel}$ is the engine's maximum output fuel efficiency,

LHV (kJ/g) is the fuel's lower heating value, $Q_{FUEL}$ (g/s) is the fuel flow rate at operational conditions, and $P_{OUT}$ is the engine mechanical shaft output power at operational conditions.

Conventional dynamometer testing is employed to establish the baseline $\eta_{MAX\_fuel}$ and in the gathering and tabulation of the relative engine losses at engine torque and speed combinations. Further, for clarity, $\eta_{MAX\_fuel}$ is determined in accordance the following relationship:

$$\eta_{\text{MAX\_fuel}} = \text{MAX}\left(\frac{P_{OUT}(Ne, Te)}{LHVQ_{FUEL}(Ne, Te)}\right) \quad (5)$$

where Ne are engine speeds in the test range of speeds; and

Te are engine torques in the test range of torques.

Ploss_fuel is computed as shown above by subtracting the actual engine output power from the amount of fuel power required to deliver that output power assuming the engine were performing at its best efficiency.

Similarly, the emission economy engine power loss term (Ploss_emission) is determined in accordance with pre-stored tabulated data. The emission economy engine power losses are provided for reference in pre-stored table format indexed by engine torque and speed. The preferred manner of generating such tables is through application of a loss equation as follows for calculation of emission economy engine power loss:

$$\text{Ploss\_}emission=\eta_{MAX\_emission}\ (\text{kJ/g})*Q_{EMISSION}\ (\text{g/s})-P_{OUT} \quad (6)$$

where $\eta_{MAX\_emission}$ is the engine's maximum output emission efficiency, $Q_{EMISSION}$ (g/s) is the emission flow rate at operational conditions, and $P_{OUT}$ is the engine mechanical shaft output power at operational conditions.

Ploss_emission can be established for any particle of emission, e.g. $NO_X$, HC, CO, $SO_2$, PM, etc., in the present form wherein $Q_{EMISSION}$ is in units of mass flow. Conventional dynamometer testing is employed to establish the baseline $\eta_{MAX\_emission}$ and in the gathering and tabulation of the relative engine losses at engine torque and speed combinations. Further, for clarity, $\eta_{MAX\_emission}$ is determined in accordance the following relationship:

$$\eta_{\text{MAX\_emission}} = \text{MAX}\left(\frac{P_{OUT}(Ne, Te)}{Q_{EMISSION}(Ne, Te)}\right) \quad (7)$$

where Ne are engine speeds in the test range of speeds; and

Te are engine torques in the test range of torques.

If other emissions are deemed to be of interest in the same regard as particle emissions as set forth herein, then a similar accounting therefor can be accomplished in accordance with the previously described example of particle emissions with appropriate unit factors to quantify the results in terms of power loss.

With reference now to FIG. 6, a preferred manner of arbitrating between the fuel and emission power losses, Ploss_fuel and Ploss_emission, is shown in a control schematic form. A bias scalar between 0 and 1 is used to variously weight the contribution of each engine power loss term. Other weighting schemes will be apparent to those skilled in the art. The individual weighted contributions from Ploss_fuel and Ploss_emission are then summed to provide the composite engine power loss term, Ploss_eng.

It will be recognized by one skilled in the art that a plurality of emissions power losses can be derived in accordance with the previous description and similarly may be arbitrated for desired contributions to the composite engine power loss term, Ploss_eng, in accordance with conventional calibration techniques.

The present invention has been described with respect to a particular exemplary hybrid powertrain implementation with various losses and cost factors described related thereto. Those skilled in the art will recognize that other hybrid and conventional powertrain arrangements can be used in conjunction with the present invention. For example, conventional electro-hydraulically controlled, multi-speed transmissions can be used in conjunction with the present invention (e.g. to optimize shift schedules for conventional step ratio transmissions for fuel economy and emissions by calculating the cost function for each different gear for a given vehicle condition). Additionally, those skilled in the art will recognize that other emissions, including emissions not measurable in terms of mass flow, may be quantified in terms of engine power loss and utilized in similar intended fashion to provide an engine operating point bias.

While the invention has been described by reference to certain preferred embodiments and implementations, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. Method for calculating an engine power loss term for use in a powertrain power loss minimization control, comprising:

providing first power loss terms corresponding to engine operating points that attribute power losses to engine operation at the engine operating points relative to an engine operating point that is maximally efficient with respect to a first engine operating metric;

providing second power loss terms corresponding to engine operating points that attribute power losses to engine operation at the engine operating points relative to an engine operating point that is maximally efficient with respect to a second engine operating metric; and combining the first and second power loss terms at respective engine operating points into an engine power loss term.

2. The method as claimed in claim 1 wherein said first engine operating metric comprises engine power per unit fuel consumption.

3. The method as claimed in claim 1 wherein said second engine operating metric comprises engine power per unit emission production.

4. The method as claimed in claim 2 wherein said second engine operating metric comprises engine power per unit emission production.

5. The method as claimed in claim 1 wherein said engine operating points comprise operating points in engine torque and engine speed.

6. The method as claimed in claim 4 wherein said engine operating points comprise operating points in engine torque and engine speed.

7. The method as claimed in claim 6 wherein said emission is selected from the group consisting of oxides of nitrogen, carbon monoxide, unburned hydrocarbons, particulate matter, sulfur dioxide, noise and combinations thereof.

8. Method for determining a desirable engine operating point for an internal combustion engine, comprising:

providing first power loss terms corresponding to engine operating points that attribute power losses to engine operation at the engine operating points relative to an engine operating point that is maximally efficient with respect to engine power per unit fuel consumption;

providing second power loss terms corresponding to engine operating points that attribute power losses to engine operation at the engine operating points relative to an engine operating point that is maximally efficient with respect to engine power per unit emission production;

combining the first and second power loss terms at respective engine operating points into a total power loss term; and selecting the desirable engine operating point as the operating point corresponding to a minimum total power loss term.

9. The method as claimed in claim 8 wherein said engine operating points comprise operating points in engine torque and engine speed.

10. The method as claimed in claim 8 wherein providing first power loss terms comprises mapping engine operating points to fuel power losses, said fuel power losses corresponding to the difference between (a) engine power attainable at a maximally fuel efficient engine operating point with engine fueling corresponding to the mapped engine operating point and (b) engine power corresponding to the mapped engine operating point.

11. The method as claimed in claim 8 wherein providing second power loss terms comprises mapping engine operating points to emission power losses, said emission power losses corresponding to the difference between (a) engine power attainable at a maximally emission efficient engine operating point with engine emissions corresponding to the mapped engine operating point and (b) engine power corresponding to the mapped engine operating point.

12. The method as claimed in claim 11 wherein said engine emissions are selected from the group consisting of oxides of nitrogen, carbon monoxide, unburned hydrocarbons, particulate matter, sulfur dioxide, noise and combinations thereof.

13. The method as claimed in claim 8 wherein:

providing first power loss terms comprises mapping engine operating points to fuel power losses, said fuel power losses corresponding to the difference between (a) engine power attainable at a maximally fuel efficient engine operating point with engine fueling corresponding to the mapped engine operating point and (b) engine power corresponding to the mapped engine operating point; and providing second power loss terms comprises mapping engine operating points to emission power losses, said emission power losses corresponding to the difference between (a) engine power attainable at a maximally emission efficient engine operating point with engine emissions corresponding to the mapped engine operating point and (b) engine power corresponding to the mapped engine operating point.

14. The method as claimed in claim 13 wherein said engine operating points comprise operating points in engine torque and engine speed.

15. The method as claimed in claim 13 wherein said engine emissions are selected from the group consisting of oxides of nitrogen, carbon monoxide, unburned hydrocarbons, particulate matter, sulfur dioxide, noise and combinations thereof.

16. The method as claimed in claim 14 wherein said engine emissions are selected from the group consisting of oxides of nitrogen, carbon monoxide, unburned hydrocarbons, particulate matter, sulfur dioxide, noise and combinations thereof.

17. Method for determining a desirable engine operating point for an internal combustion engine, comprising:

mapping engine operating points to fuel power losses, said fuel power losses corresponding to the difference between (a) engine power attainable at a maximally fuel efficient engine operating point with engine fueling corresponding to the mapped engine operating point and (b) engine power corresponding to the mapped engine operating point;

mapping engine operating points to emission power losses, said emission power losses corresponding to the difference between (a) engine power attainable at a maximally emission efficient engine operating point with engine emissions corresponding to the mapped engine operating point and (b) engine power corresponding to the mapped engine operating point;

weighting the fuel power losses and emission power losses at the mapped engine operating points;

aggregating the weighted fuel power losses and emission power losses into total power loss terms at the mapped engine operating points; and selecting the desirable engine operating point as the mapped engine operating point corresponding to a minimum total power loss term.

18. The method as claimed in claim 17 wherein said engine operating points comprise operating points in engine torque and engine speed.

19. The method as claimed in claim 17 wherein said engine emissions are selected from the group consisting of oxides of nitrogen, carbon monoxide, unburned hydrocarbons, particulate matter, sulfur dioxide, noise and combinations thereof.

20. The method as claimed in claim 18 wherein said engine emissions are selected from the group consisting of oxides of nitrogen, carbon monoxide, unburned hydrocarbons, particulate matter, sulfur dioxide, noise and combinations thereof.

* * * * *